April 4, 1950   W. C. PHILLIPS   2,502,986
BEARING
Filed Feb. 20, 1947
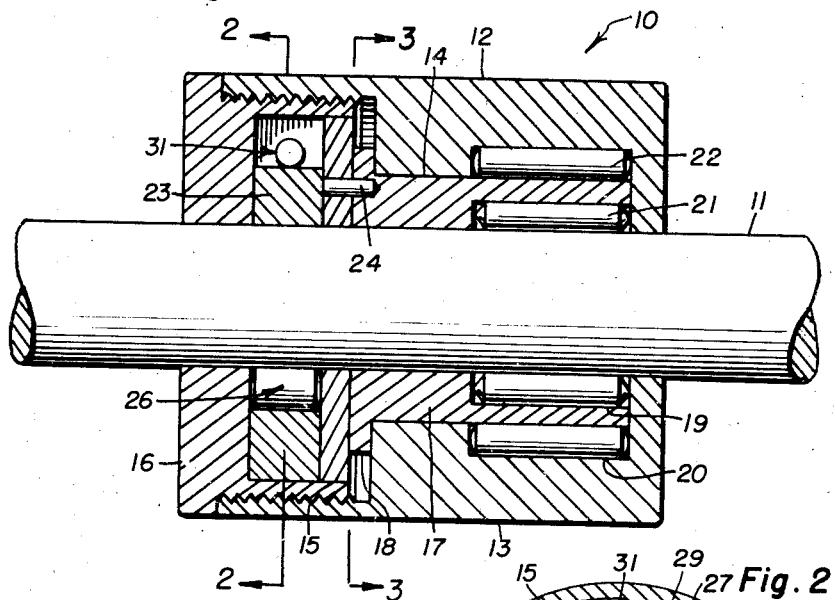
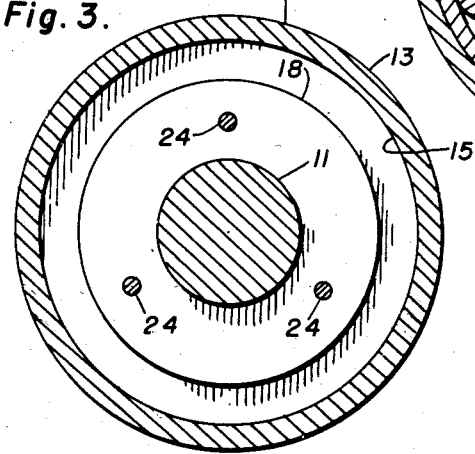
Inventor
William C. Phillips
By Clarence A. O'Brien
and Harvey B. Jacobson
Attorneys Patented Apr. 4, 1950

2,502,986

UNITED STATES PATENT OFFICE 2,502,986

BEARING

William C. Phillips, Rocky Mount, N. C.

Application February 20, 1947, Serial No. 729,689

1 Claim. (Cl. 308—183)

1

This invention relates to new and useful improvements and structural refinements in bearings, more specifically, anti-friction bearings, and the principal object of the invention is to substantially minimize the rapid wear to which such bearings are subjected when they are employed in association with parts having an oscillatory rather than a rotary motion.

Examples of anti-friction bearings used in association with oscillating parts can be found in virtually all types of machinery, such as engine crossheads, automobile steering knuckles, universal joints, to mention but a few. In all such instances, one bearing race is usually "fixed" while the other oscillates, so that the balls or needles with which the bearing is provided are rotated first in one direction and then in the other, but in either event, they continually engage the same portion of the bearing races. As a result, considerable amount of wear develops, both in the balls or needles and in the races, so that the span of life of the bearing as a whole is greatly and unnecessarily reduced.

It is, therefore, a further object of the instant invention to substantially minimize such wear, as aforesaid, this being accomplished primarily by imparting intermittent rotary motion to the bearing balls or needles, even though the part with which the bearing is associated merely oscillates.

Another object of the invention is to provide a bearing which is simple in construction and operation, which will readily lend itself to economical manufacture, and which may find countless applications in various mechanical fields.

An additional object of the invention is to provide a bearing which will not easily become damaged, which may be readily disassembled for purposes of inspection and maintenance, and which is otherwise well adapted for the various purposes for which it may be used.

With the above more important objects in view, and such other objects as may become apparent as this specification proceeds, the invention consists essentially of the arrangement and construction of parts as illustrated in the accompanying drawings, in which:

Figure 1 is a cross sectional view of the invention,

Figure 2 is a cross sectional view, taken substantially in the plane of the line 2—2 in Figure 1, and Figure 3 is a cross sectional view, taken substantially in the plane of the line 3—3 in Figure 1.

2

Like characters of reference are used to designate like parts in the specification and throughout the several views.

Referring now to the accompanying drawings in detail, the invention consists of a bearing designated generally by the reference character 10, the same embodying in its construction a suitable shaft 11 and a housing 12 rotatably positioned thereon, the housing preferably comprising a substantially cylindrical body 13 formed with a concentric recess 14 which, in turn, is enlarged and screw threaded as at 15 in order to receive a cap 16.

By providing this removable end cap, access may be had to the interior components of the bearing for purposes of assembly and disassembly, as will be clearly apparent.

One of the internal components is what may be referred to as a sleeve 17 which is rotatably mounted on the shaft 11 and is disposed in the recess 14. The sleeve 17 is, of course, also rotatable with respect to the housing 12 and one end of the sleeve terminates in an annular flange 18 positioned in the enlarged portion 15 of the bore.

Both the bore of the sleeve 17 and the recess 14 of the housing 12 are relieved so as to provide what may be referred to as inner and outer bearing races 19 and 20 respectively. A plurality of suitable anti-friction elements exemplified by the bearing needles 21, 22 are positioned in the respective races 19, 20, in other words, the anti-friction elements are provided between both the shaft 11 and the sleeve 17, as well as between the sleeve and the housing 12.

A block 23, disposed in the recessed portion 15, is rotatable on the shaft 11, said block being provided with a plurality of dowel pins 24 whereby it is rigidly secured to a circular back plate 25 and also, to the aforementioned sleeve 17. It will be noted that the plate 25 is interposed between the block 23 and the flange 18 of the sleeve, as is best shown in Figure 1.

The block 23 constitutes a component of two over-running clutch assemblies 26, 27, the former of which operatively connects the block to the shaft 11, while the latter similarly connects the block to the housing 12.

Each of these clutch assemblies is of a more or less conventional type, comprising a plurality of rollers 28 positioned in suitable recesses 29 with which the block 23 is provided, and normally urged by means of spring pressed plungers 31 in engagement with the lateral wall of the shaft 11 or of the housing 12 (more specifically of the cap 16), as the case may be.

However, it will be noted that the two clutches 26, 27 are adapted to act in relatively opposite directions, that is, the clutch 26 is intended to impart motion to the block 23 when the shaft 11 rotates in the direction of the arrow 32, but no motion will be imparted to housing 12 while the block rotates in this same direction, and vice versa.

When the invention is placed in use, it will be found that an oscillatory movement of either the housing 12 or of the shaft 11 will impart an intermittent rotary motion to the sleeve 14, and hence, to the anti-friction elements 21, 22.

By way of further explanation, it may be assumed that the bearing is installed in a crosshead of a steam engine between the connecting rod and the reciprocating cross-head member. It may be further assumed that the shaft 11 constitutes the stationary crosshead pin, while the housing 12 is pressed into the connecting rod and oscillates therewith. Accordingly, when the housing oscillates in the direction of the arrow 32, motion in the same direction will be imparted to the block 23 through the medium of the clutch 27, while at the same time, the clutch 26 will permit the block 23 to slip on the shaft 11, as will be clearly understood from the accompanying Figure 2.

Accordingly, the movement of the block 23 will be transmitted through the medium of the pin 24 to the sleeve 17 and hence to the anti-friction rollers 21, 22. However, when the housing 12 moves in a relatively opposite direction, namely, in the direction of the arrow 33, the clutch 27 will simply "slip" and no movement will be transmitted to the block 23. As a result, intermittent rotary motion will be transmitted to the sleeve 17 and to the bearing needles by the oscillatory motion of the housing. Furthermore, it will be found that the same intermittent rotary motion will be imparted to the sleeve when the housing is stationary and the shaft 11 is oscillated.

In closing, it may be added that the particular configurations of parts illustrated in the accompanying drawings has been shown for illustrative purposes only, and that the shape of the various parts, particularly of the housing 12, may be altered as required to suit various operating conditions.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A bearing comprising in combination, a shaft, a housing positioned on and rotatable with respect to said shaft, a rotatable sleeve mounted on said shaft in said housing and co-acting with said shaft and housing to form inner and outer bearing races, an over-running clutch operatively connecting said sleeve to said shaft, and a further over-running clutch operatively connecting said housing to said sleeve, said clutches acting in relatively opposite directions whereby intermittent rotary motion may be imparted to said sleeve.

WILLIAM C. PHILLIPS.

REFERENCES CITED

The following references are of record in the file of this patent:

UNITED STATES PATENTS

| Number | Name | Date |
| --- | --- | --- |
| 1,574,470 | Coffee | Feb. 23, 1926 |
| 1,899,691 | Jablow | Feb. 28, 1933 |
| 1,940,345 | Brownlee | Dec. 19, 1933 |
| 2,030,953 | Gemeny | Feb. 18, 1936 |

FOREIGN PATENTS

| Number | Country | Date |
| --- | --- | --- |
| 356,502 | Great Britain | Sept. 10, 1931 |